Sept. 13, 1966   M. P. HNILICKA   3,273,092
ELONGATED SUPERCONDUCTIVE PRODUCT
Filed Oct. 10, 1963

3,273,092
ELONGATED SUPERCONDUCTIVE PRODUCT

Milo P. Hnilicka, Concord, Mass., assignor to National Research Corporation, Cambridge, Mass., a corporation of Massachusetts
Filed Oct. 10, 1963, Ser. No. 315,152
5 Claims. (Cl. 335—216)

This invention relates to high field superconductors and is a continuation-in-part of my copending application Serial No. 260,357, filed February 25, 1963, now Patent No. 3,227,930.

It is a principal object of the invention to provide an improved superconductive product in the form of a flat ribbon, or alternatively, a round wire which will have higher current densities than state of the art products.

It is a further object of the invention to provide a ductile product which can be used in superconductive coils.

Other objects of the invention will in part be obvious and will in part appear hereinafter.

The invention accordingly comprises an improved superconductive product suitable for use in superconductive electromagnetic coils.

Figure 1:
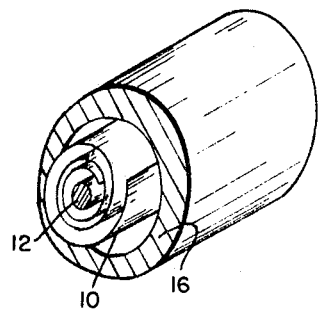
Figure 2A:
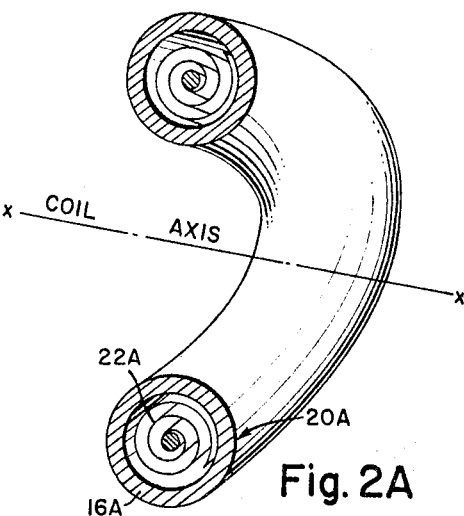
Figure 2:
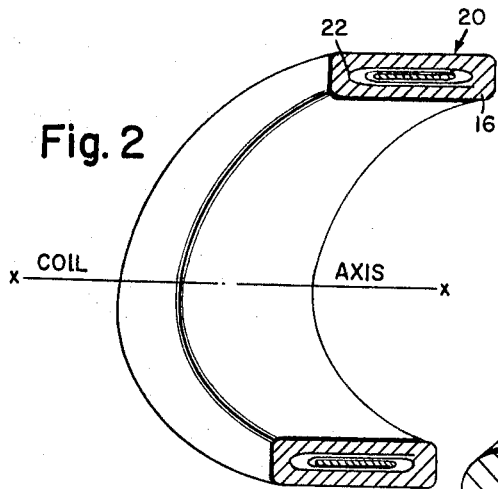
Figure 3:
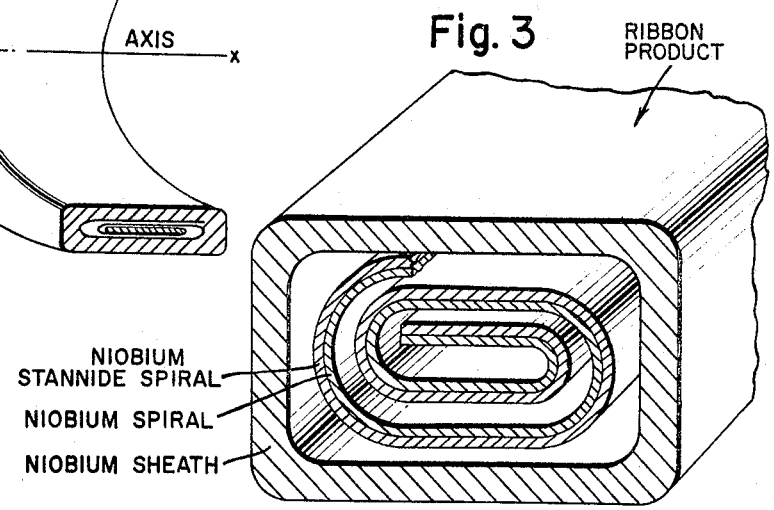

For a further understanding of the nature and objects of the invention, reference should be had to the following detailed description taken in conjunction with the accompanying drawing in which FIG. 1 shows the principal step in manufacturing the product of the invention and; FIG. 2 shows the resultant product wound as a half-turn of an electromagnetic coil and FIG. 2A shows a variation of the product in round wire form wound as a half-turn of an electromagnetic coil; and FIG. 3 is a diagrammatic cross-section view of the composite foil material used as a component of the assembly shown in FIGS. 2–2A. Portions of the foil in two adjacent turns as they appear after heat treatment are shown.

In accordance with a preferred embodiment of the invention a sheet of electron beam melted niobium is cold rolled down to 2–3 mils thickness and then vacuum annealed. The foil is then laminated or coated with tin on one surface thereof. The composite foil thus formed indicated by a reference numeral 10 in the drawing is wound as a 50-turn spiral about a niobium mandrel 12 having a diameter of 5–10 mils. The spiral is tightly wound to provide a high packing factor. Then the spiral, which is now between .1 and .5 inch in outer diameter, is encased in a sheath 16 of niobium and capped at its ends for cold rolling. The composite is cold rolled in the manner taught by Allen, Das and Stauffer in their copending applications, S.N. 207,320, filed July 3, 1962 and S.N. 278,723, filed May 7, 1963. Large reductions in thickness are provided to improve the wettability of the niobium by its adjacent tin layer. At the end of the cold rolling, the thickness of the niobium layers is on the order of 2–3 microns. The composite may be flattened to ribbon form or utilized as a round wire.

The cold worked composite is then heated to react the niobium and tin at their interfaces to form a superconductive niobium stannide layer having a transition temperature of about 18° K. The heat treatment is preferably carried out between 900–1000° C.; for less than one hour at 900° C., less than fifteen minutes at 1000° C. The thickness of tin is provided as in excess of one micron at the end of the cold rolling so that there will be residual tin at the end of the heat treatment. There should also be sufficient residual niobium to separate the niobium stannide turns for the most part. The heat treatment should be concluded with a rapid quench, as by air cooling the composite, to limit formation of tin rich compounds as the composite cools.

The resultant product is a round wire about 20 mils in diameter, as shown in FIG. 2A, (reference numeral 20A in FIG. 2A), or a ribbon about 5 mils thick as shown at 20 in FIG. 2. In cross-section, the product comprises a niobium sheath (indicated by reference numeral 16A in FIG. 2A and by reference numeral 16 in FIG. 2) and a central mass of niobium and niobium-stannide in the form of interleaved spirals, the niobium stannide layers being indicated at 22 in FIG. 2 and at 22A in FIG. 2A. Typically, there would be about 50 turns of each layer, of which about half would be sufficiently separated radially to act as separate turns.

The product would have high current densities for the overall cross-section. Secondly, the product would be sufficiently ductile to withstand the mechanical and thermal shocks inherent in operating a coil at liquid helium temperatures and over a range of a hundred kilogauss. Third, the product would have a long time constant of quenching because of the long lateral length and small thickness inherent in the spiral arrangement; this allows the stannide to recover from transient overloads and remain superconductive and avoids explosive conditions when the superconductivity of the stannide layer is quenched. Fourth, the thin layers of niobium would go normal at low current densities (rather than later when there is more energy stored in the coil); the eddy currents and joule heating produced in the niobium would be sufficiently small and the quenching time constant of the niobium stannide sufficiently long that the stannide would remain superconductive until the transient heat is dissipated. This last advantage makes the product particularly suitable for alternating current usage.

In connection with the ductility of the product, it would be possible to bend it into the form of coils after heat treatment. This makes it possible to apply cheap organic insulation after heat treatment rather than ceramic insulation before heat treatment. However, the invention also contemplates the use of the product in coils wound before heat treatment.

The invention is also applicable to formation of other high field superconductivity alloys of the beta tungsten structure (e.g. vanadium gallide, vanadium silicide, niobium-aluminum).

The superconductive alloy turns can also be separated by metals aside from one of the components of the alloy. For instance, the niobium foil of the above-described preferred embodiment can be a clad of niobium on iron or other ferromagnetic material. The open surface of niobium is laminated with tin and the open surface of the iron is oxidized by anodizing. Allen et al. teach in their copending application S.N. 311,438, filed September 25, 1963, that the presence of oxide layers can be made compatible with the cold rolling wettability treatment. During heat treatment, tin will react with the adjacent clean niobium layers rather than the iron layers which are covered with inert oxide. The presence of a ferromagnetic substance between turns of niobium stannide accelerates the quenching of niobium at an early point of operation, which is safe for the niobium stannide.

What is claimed is:

1. An elongated superconductive wire product for carrying current along the axial length thereof and useful for such purposes as electromagnetic coils, the elongated product itself consisting essentially of:
    (a) an annular metal sheath with a hollow core;
    (b) a layer of high-field-superconductive alloy material within the core in the form of a first spiral, the said first spiral layer running through the portion of the current carrying length of the elongated product where current is to be carried superconductively;
    (c) a layer of a second material in the core in the form of a second spiral, the turns of the first spiral being interleaved with turns of the second spiral so that turns of the first spiral are separated from each other, the second material being selected from materials which are non-superconducting under conditions of high field; the said elongated wire product being constructed and arranged so that the lateral length of superconductive alloy within the core, as seen in a cross-section plane perpendicular to the axis of the wire product, is greater than the cross section peripheral length of the metal sheath.

2. The wire product of claim 1 with a circular cross section.

3. The wire product of claim 1 as a ribbon or flat wire.

4. The wire product of claim 1 wherein the alloy is a compound of the beta-tungsten structure.

5. The wire product of claim 1 wherein the material separating the turns comprises one of the components of the alloy.

References Cited by the Examiner

UNITED STATES PATENTS

| | | | |
|---|---|---|---|
| 2,739,371 | 3/1956 | Grisdale et al. | 29—155.57 |
| 2,988,804 | 6/1961 | Tibbetts | 29—155.57 |
| 3,124,455 | 3/1964 | Buehler et al. | 317—158 |
| 3,173,079 | 3/1965 | McFee. | |
| 3,181,936 | 5/1965 | Denny et al. | |

OTHER REFERENCES

IBM Technical Disclosure Bulletin, vol. 5, No. 7, December 1962.

BERNARD A. GILHEANY, *Primary Examiner.*

JOHN F. BURNS, ROBERT K. SCHAEFER, *Examiners.*

G. HARRIS, Jr., *Assistant Examiner.*